J. G. LOCKWOOD.
Improvement in Horse Hay-Rakes.
No. 115,071. Patented May 23, 1871.
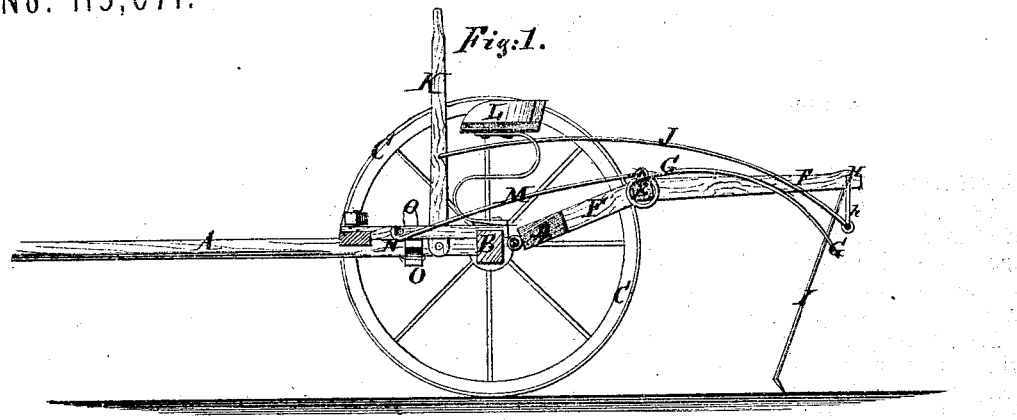
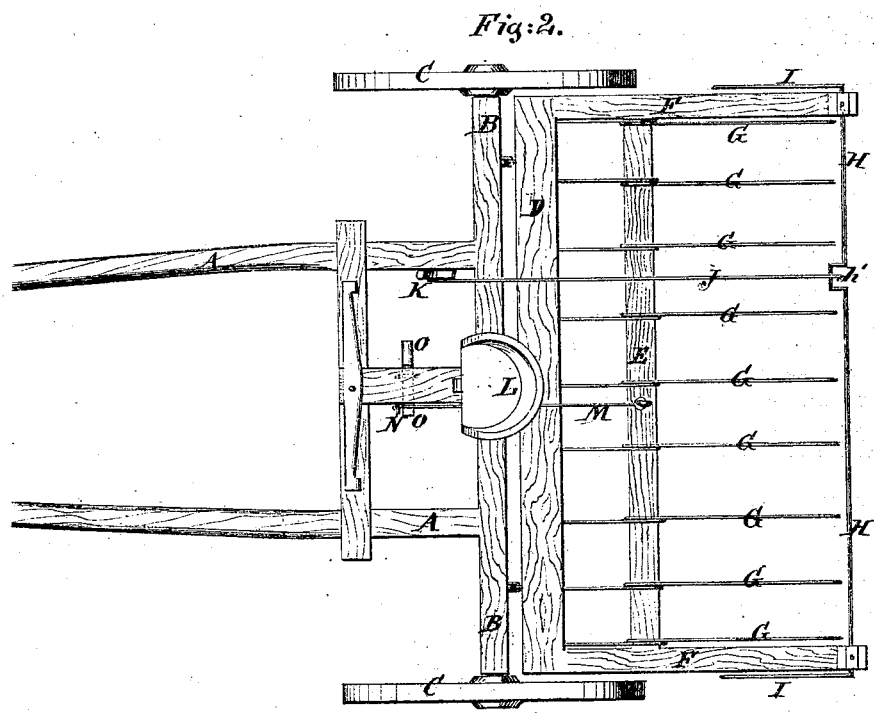
Witnesses:
M. Vorlaender
Wm. H. C. Smith.
Inventor:
J. Geo. Lockwood.
Per
Attorneys.

UNITED STATES PATENT OFFICE.

J. GEORGE LOCKWOOD, OF WEST DAVENPORT, NEW YORK.

IMPROVEMENT IN HORSE HAY-RAKES.

Specification forming part of Letters Patent No. 115,071, dated May 23, 1871.

*To all whom it may concern:*

Be it known that I, J. GEORGE LOCKWOOD, of West Davenport, in the county of Delaware and State of New York, have invented a new and useful Improvement in Horse Hay-Rakes; and I do hereby declare that the following is a full, clear, and exact description thereof, which will enable others skilled in the art to make and use the same, reference being had to the accompanying drawing forming part of this specification, in which—

Figure 1 is a detail sectional view of my improved rake. Fig. 2 is a top view of the same.

Similar letters of reference indicate corresponding parts.

My invention has for its object to improve the construction of horse hay-rakes; and the invention consists in a combination of certain devices for holding the rake-head away from the ground, when desired, as hereinafter described and claimed.

A are the thills, which are securely and rigidly attached to the axle B, upon the journals of which the wheels C revolve, and to which the rake-head D E F G is pivoted or hinged. D E are the parallel longitudinal bars of the rake-head, the ends of which are attached to the end bars F. The rear parts of the end bars F are inclined downward and extend back a little beyond the rear ends of the wire teeth G. The wire teeth G are curved into proper form to collect the hay, are coiled around the rear longitudinal bar E, and their ends are secured to the forward longitudinal bar D of the rake-head. H is a rod or bar, which works in bearings in the rear ends of the end bars F, and to its ends are attached or upon them are formed arms I, the ends of which are pointed and inclined, as shown in Fig. 1, so that when the arms I are turned forward the said points may be turned downward or toward the ground to catch upon the ground, and as the machine is drawn forward to raise the rake-head and discharge the collected hay, and so that when the said arms I are turned rearward they may be readily drawn along the ground without catching upon it. To the rod H is attached, or upon it is formed, a crank, $h'$, to which is pivoted the rear end of the connecting-rod J, the forward end of which is pivoted to the lever K. The lower end of the lever K is pivoted to the frame-work of the rake in such a position that its upper end may be easily reached and operated by the driver from his seat L.

While the machine is at work collecting hay the arms I are drawn along the ground in the rear of the machine. When sufficient hay has been collected the driver moves the upper end of the lever K forward. This raises the arms I and carries them forward a little past the vertical line, allowing them to drop to the ground by their own weight. As the points of the arms I strike the ground they take hold of it, and as the machine continues to advance the rake-head is raised, discharging the collected hay, the rake-head dropping to the ground in front of the windrow, and the arms I being again drawn along the ground in the rear of the machine.

M is a catch-rod, the rear end of which is pivoted to the rake-head. The forward end of the rod M is bent upward, or has a hook formed upon it to take hold of a catch-pin, N, attached to the frame of the machine. O is a foot-lever, pivoted to the frame of the machine in such a position as to be beneath the rod M.

By this construction, as the driver raises the rake-head in the manner hereinbefore described, by placing his foot upon the lever O, he raises the catch-hook M so that it will take hold of the catch-pin N and support the rake-head away from the ground. As the lever O is released the catch-hook M drops away from the catch-pin N, allowing the rake-head to fall to the ground in position to collect hay.

Having thus described my invention, I claim as new and desire to secure by Letters Patent—

The catch-hook M, catch-pin N, and foot-lever O, in combination with the rake-head and rake-frame, and with the device I H $h'$ J K for raising the rake-head, substantially as herein shown and described, and for the purpose set forth.

J. GEORGE LOCKWOOD.

Witnesses:
   J. B. TERO,
   A. DEWAINE FORD.